(12) United States Patent
Wu et al.

(10) Patent No.: US 6,861,492 B2
(45) Date of Patent: Mar. 1, 2005

(54) GOLF BALL COVER COMPOSITIONS

(75) Inventors: Shenshen Wu, North Dartmouth, MA (US); Murali Rajagopalan, South Dartmouth, MA (US); Kevin M. Harris, New Bedford, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 52 days.

(21) Appl. No.: 10/407,641

(22) Filed: Apr. 4, 2003

(65) Prior Publication Data

US 2004/0198940 A1 Oct. 7, 2004

(51) Int. Cl.[7] ............... A63B 37/12; A63B 37/06; C08G 18/61; C08G 77/458
(52) U.S. Cl. ............... 528/28; 528/29; 473/354; 473/371; 473/374; 473/378
(58) Field of Search ............... 528/28, 29; 473/354, 473/371, 374, 378

(56) References Cited

U.S. PATENT DOCUMENTS

| 5,484,870 | A |   | 1/1996  | Wu ............... 528/28 |
|-----------|---|---|---------|--------------------------|
| 5,820,491 | A | * | 10/1998 | Hatch et al. ............... 473/378 |
| 5,833,552 | A |   | 11/1998 | Hamada et al. ............... 473/359 |
| 6,159,110 | A |   | 12/2000 | Sullivan et al. ............... 473/374 |
| 6,162,134 | A |   | 12/2000 | Sullivan et al. ............... 473/373 |
| 6,204,331 | B1 |  | 3/2001  | Sullivan et al. ............... 525/221 |
| 6,207,784 | B1 |  | 3/2001  | Rajagopalan ............... 528/71 |
| 6,441,095 | B1 |  | 8/2002  | Keller et al. ............... 525/221 |
| 6,476,147 | B1 |  | 11/2002 | Sullivan et al. ............... 525/221 |
| 6,739,987 | B2 | * | 5/2004 | Harris et al. ............... 473/378 |
| 2003/0083158 | A1 | * | 5/2003 | Ishino ............... 473/378 |
| 2003/0114624 | A1 | * | 6/2003 | Harris et al. ............... 528/28 |

FOREIGN PATENT DOCUMENTS

JP  2003165822  *  6/2003

* cited by examiner

Primary Examiner—David J. Buttner
(74) Attorney, Agent, or Firm—William B. Lacy

(57) ABSTRACT

A golf ball comprising a core and a cover, wherein the core or the cover comprises a thermoplastic or thermoset composition comprising a reaction product of an isocyanate and a siloxane polyahl having a formula of:

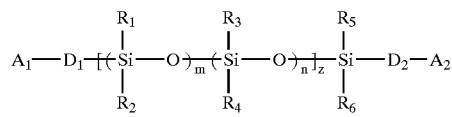

where $R_1$ is a hydrocarbon moiety; $R_2$ to $R_6$ are independently selected from hydrogen or hydrocarbon moieties; $D_1$ and $D_2$ are optional and independent hydrocarbon moieties; $A_1$ and $A_2$ are independent active hydrogen moieties; m is an integer from 1 to about 1,000; n is zero or an integer from 1 to about 1,000; and z is an integer from 1 to about 100.

24 Claims, No Drawings

GOLF BALL COVER COMPOSITIONS

FIELD OF THE INVENTION

The present invention relates to golf balls, and more particularly to novel polyurethane, polyurea, or polyurethane/polyurea hybrid (i.e., polyurethane/urea and/or polyurea/urethane) compositions for golf ball cover layers with enhancement in UV resistance, oxidative stability, hydrophobicity, abrasion resistance, softness and resiliency.

BACKGROUND OF THE INVENTION

The United States Golf Association ("USGA") provides five (5) regulations to keep golf balls consistent. Specifically, the golf ball must weigh no more than 1.62 ounces and measure no less than 1.68 inches in diameter. The initial velocity of the ball as tested on a USGA machine at a set club head speed must not exceed 255 ft/sec. The overall distance of the ball as tested with a USGA specified driver at 160 ft/sec and a 10-degree launch angle must not exceed 296.8 yards. Furthermore, the ball must pass a USGA administered symmetry test. Within the confines of these regulations, other performance characteristics of the ball, including distance, durability, feel, spin, sound, and the like may be modified through alterations in material compositions, constructions, diameters and/or thickness, and surface configurations of various portions of the ball, such as the core, the cover, and intermediate layer(s) therebetween. Other physical, mechanical, chemical, and/or optical properties of the portions, including color stability, compression, density, flexural modulus, gas or vapor permeability, hardness, stiffness, tear resistance, weight, and the like may also be effected by these alterations.

Conventional cover or intermediate layer materials for golf balls include ionomer resins and polyurethanes. Chemically, ionomer resins are acid/olefin copolymers having 10% to 100% of an α,β-ethylenically unsaturated carboxylic acid neutralized by a metal ion. Ionomer covers are virtually cut-proof, but they provide inferior spin and feel to the golf balls. Polyurethanes are typically formed from a polyol and an isocyanate, with an optional curing agent. Conventional polyurethane covers generally afford excellent feel and good durability, but not resilience or light stability comparable to ionomer covers. Polyurea compositions comprising the reaction product of an isocyanate and a polyamine have also been proposed as cover materials for golf balls. Like polyurethanes, polyurea is not completely comparable to ionomer covers with respect to resilience. Therefore, there remains a continuing need for golf ball cover materials and compositions with superior resistance to cut, scratch, abrasion, discoloration, moisture, and other wearing and weathering elements, that improves resilience and feel.

In particular, the polydimethylsiloxane ("PDMS") polyahls as disclosed below have various properties desirable in golf ball applications, such as softness, water vapor resistance, abrasion and shear resistance, stability to heat and oxidation, and elasticity. Golf balls that incorporate the PDMS polyahls may have improved resilience and feel.

SUMMARY OF THE INVENTION

The present invention is directed to a golf ball comprising a core and a cover, and an optional intermediate layer disposed between the core and the cover. At least one of these portions comprises a thermoplastic or thermoset composition comprising a reaction product of an isocyanate and a siloxane polyahl. The siloxane polyahl may be a homo-oligomer, co-oligomer, hompolymer, or copolymer containing a repeating siloxane monomer unit with a structure of:

where $R_1$ is a hydrocarbon moiety, and $R_2$ is hydrogen or a hydrocarbon moiety. The siloxane monomer unit has a repetition of preferably at least about 5, more preferably at least about 10. The siloxane polyahl has terminal active hydrogen groups, preferably primary or secondary hydroxy or amine groups. Preferably, the siloxane polyahl has a formula of:

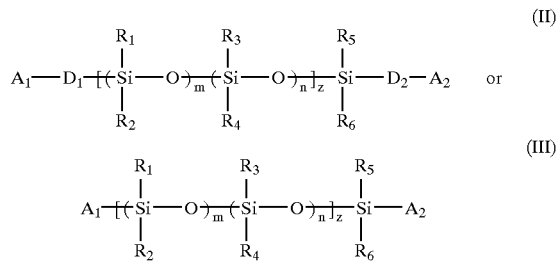

where $R_1$ is a hydrocarbon moiety, $R_2$ to $R_6$ are independently selected from hydrogen or hydrocarbon moieties, $D_1$ and $D_2$ are optional and independent hydrocarbon moieties, $A_1$ and $A_2$ are independent active hydrogen moieties, m is an integer from 1 to about 1,000, n is zero or an integer from 1 to about 1,000, and z is an integer from 1 to about 100. Suitable hydrocarbon moieties may be linear, branched, aromatic, aliphatic, or alicyclic, having 1 to about 12 carbon atoms. Suitable active hydrogen moieties include primary hydroxy groups, secondary hydroxy groups, primary amine groups, and secondary amine groups. $D_1$ and $D_2$, when present, are preferably saturated. Most preferably, the siloxane polyahl is a hydroxy-terminated PDMS, amine-terminated PDMS, or amine/hydroxy-terminated PDMS.

The isocyanate may be organic, modified organic, aliphatic, alicyclic, unsaturated, aralipahtic, aromatic, substituted, or unsubstituted, and includes isocyanate-containing monomers, dimers, trimers, multimeric adducts, oligomers, polymers, prepolymers, low-free-monomer prepolymers, quasi-prepolymers, diisocyanates, polyisocyanates, biurets, uretdiones, isocyanurates, or blends thereof. The reaction product of the isocyanate and the siloxane polyahl may be a thermoplastic or thermoset polyurethane, polyurea, or polyurethane/polyurea hybrid; a castable reactive liquid material; or a prepolymer thereof.

In one embodiment, the siloxane polyahls reacts with the isocyanate and forms a prepolymer. The siloxane polyahl has a molecular weight of preferably about 500 to about 150,000, and may be used alone, in combination of two or more thereof, or in combination with one or more reactive polyahls at a weight ratio of about 1:20 to about 20:1, to react with the isocyanate at an equivalent ratio of about 0.01:1 to about 3:1. Suitable oligomeric or polymeric reactive polyahls include any aliphatic, alicyclic, aralipahtic, or aromatic polyahls, such as polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, or combinations thereof. The prepolymer preferably has a NCO content of less than about 15 percent, and may be cured with a curing agent at an equivalent ratio of about 1:0.6 to about 1:1.5. Suitable curing agents may be saturated or unsaturated, and include monomeric polyahls, oligomeric polyahls, polymeric polyahls, polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, diols, triols, tetraols, polyols, diamines, triamines, tetramines, polyamines, amino alcohols, or blends thereof.

In another embodiment, the siloxane polyahl is used in a curing agent in addition to a reactive polyahl and the isocyanate to form a thermoplastic or thermoset reaction product. The siloxane polyahl has a molecular weight of preferably less than about 50,000. The siloxane polyahl is present by at least about 0.05 equivalent to 1 equivalent of the curing agent, and may be used alone, in combination of two or more thereof, or in combination with one or more of the curing agents disclosed herein at a weight ratio of about 1:20 to about 20:1. The siloxane polyahl reacts with the isocyanate at an equivalent ratio of about 0.01:1 to about 3:1. The reactive polyahl may be any one disclosed herein, or combination of two or more thereof, preferably first reacts to the isocyanate at an equivalent ratio of about 1.5:1 to about 3:1 to form a prepolymer with a NCO content of less than about 15 percent, which is then reacted to the curing agent comprising the siloxane polyahl at an equivalent ratio of about 1:0.6 to about 1:1.5.

For the golf ball cover to be highly light stable, the thermoplastic or thermoset compositions or reaction products of the present invention are preferably substantially saturated. More preferably, the reactants that form the compositions or the reaction products, including the siloxane polyahl, the isocyanate, the reactive polyahl, and the curing agent are all substantially saturated when present. The reaction product has a material hardness of preferably less than about 70 Shore D, more preferably less than about 60 Shore D.

The golf ball comprising the compositions or the reaction products disclosed in the present invention may have a two-piece or multi-layer structure. The core may have a solid, liquid-filled, or gas-filled center and one or more outer core layers. The cover may have an outer cover layer and one or more inner cover layers. The inner or outer cover layer may be formed from a thermoplastic polyurethane, thermoset polyurethane, thermoplastic polyurea, or thermoset polyurea, preferably has a Shore D hardness of about 30 to about 70, and a flexural modulus of about 10,000 psi to about 80,000 psi. The golf ball has a compression of preferably less than about 100, more preferably less than about 90.

Definitions

As used herein, the term "polyahl" or "reactive polyahl" refers to any one compound or a mixture of compounds containing a plurality of active hydrogen moieties per molecule. Illustrative of such active hydrogen moieties are —OH (hydroxy group), —SH (thio group), —COOH (carboxylic acid group), and —NHR (amine group), with R being hydrogen, alkyl, aryl, or epoxy. These active hydrogen moieties are reactive to free isocyanate groups, forming urethane, urea, thiourea or corresponding linkage depending on the particular active hydrogen moiety being reacted. The polyahls may be monomers, homo-oligomers, co-oligomers, homopolymers, or copolymers, and include the compounds described in U.S. Pat. Nos. 4,394,491 and 4,822,827. Oligomeric and polymeric polyahls having at least one NCO-reactive group on each terminal of a backbone are typically employed as the soft segment in reaction products such as polyureas and polyurethanes. Depending on the terminal groups, the oligomeric and polymeric polyahls may be identified as polyols (with —OH terminals only), polyamines (with —NHR terminals only), or amino alcohol oligomers or polymers (with both —OH and —NHR terminals). Such polyahls of a lower molecular weight and monomeric polyahls are commonly referred to as curing agents. The polyahls are generally liquids or solids meltable at relatively low temperatures.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, preferably less than 5.

As used herein, the term "percent NCO" or "% NCO" refers to the percent by weight of free, reactive, and unreacted isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pascal ("Pa") or pounds per square inch ("psi"), is derived in accordance to ASTM D6272-02.

As used herein, the term "water vapor transmission rate" ("WVTR") refers to the mass of water vapor that diffuses into a material of a given thickness per unit area per unit time at a specific temperature and humidity differential. Standard tests for WVTR include ASTM E96-00.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

The term "about," as used herein in connection with one or more numbers or numerical ranges, should be understood to refer to all such numbers, including all numbers in a range.

DETAILED DESCRIPTION OF THE INVENTION

Golf balls of the present invention may have a variety of constructions, comprising at least a core, a cover, and one or more optional intermediate layers disposed between the core and the cover. The core may be a single solid mass, or include a center and one or more outer core layers. The center may further be solid, liquid-filled, gel-filled, or gas-filled. The cover may include an outer cover layer and, optionally, one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The cover and coating of the golf ball provide the interface between the ball and a club and other objects such as trees, cart paths, and grass. Properties that are desirable for the cover include good moldability, high abrasion resistance, high tear strength, and high resilience. The cover generally provides sufficient strength for good performance characteristics and durability. The cover may have a single-layer construction, or a multi-layer construction that includes one or more inner cover layers and an outer cover layer. The cover compositions described herein, while applicable in any portion of the golf ball, are preferably used to form cover layer(s), including single-layer covers, inner cover layers, and/or outer cover layers.

The cover layer, particularly the outer cover layer, of the present invention may comprise about 1% to about 100%, preferably about 10% to about 90%, of a thermoplastic or thermoset composition comprising a thermoplastic or thermoset reaction product, preferably formed from a castable reactive liquid material, of an isocyanate and a siloxane polyahl. The siloxane polyahl may be a monomer, but is preferably a homo-oligomer, co-oligomer, homopolymer, or copolymer having a repeating siloxane monomer unit. A preferred monomer unit structure is:

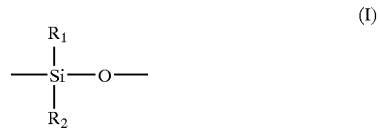

where $R_1$ is a hydrocarbon moiety, and $R_2$ is hydrogen or a hydrocarbon moiety. Structure (I) is a diorganosiloxane monomer unit when $R_2$ is a hydrocarbon moiety, or a dialkylsiloxane monomer unit when $R_1$ and $R_2$ are both alkyl moieties. The siloxane monomer unit may have a repetition of at least about 5, preferably at least about 10. The siloxane polyahl preferably has at least one active hydrogen moiety at each terminal of its backbone.

More preferably, the siloxane polyahl has a formula of:

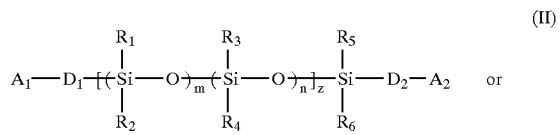

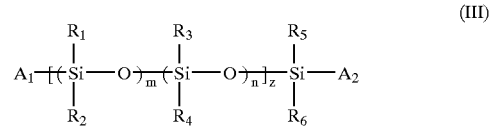

where $R_1$ is a hydrocarbon moiety, $R_2$ to $R_6$ are independently selected from hydrogen or hydrocarbon moieties, $D_1$ and $D_2$ are optional and independent hydrocarbon moieties, $A_1$ and $A_2$ are independent active hydrogen moieties, m is an integer from 1 to about 1,000, n is zero or an integer from 1 to about 1,000, and z is an integer from 1 to about 100. At least one of m or n is preferably about 5 to about 500, and more preferably from about 10 to about 200. Any of the hydrocarbon moieties may be linear, branched, substituted, unsubstituted, saturated, unsaturated, cyclic, aliphatic, araliphatic, alicyclic, or aromatic, and include, but are not limited to, alkenyl, alkyl, alkylene, aryl, aralkyl, cylcoalkyl, phenyl, or vinyl moieties. Preferred hydrocarbon moieties have 1 to about 12 carbon atoms. Suitable active hydrogen moieties include primary hydroxy groups, secondary hydroxy groups, primary amine groups, and secondary amine groups. $D_1$ and $D_2$ are preferably saturated when present. Most preferably, the siloxane polyahl is a hydroxy-terminated PDMS (such as PDMS diol), amine-terminated PDMS (such as PDMS diamine), or amine/hydroxy-terminated PDMS (such as PDMS amino alcohol).

The siloxane polyahl may have any molecular weight suitable for application in golf balls. When used as a soft segment, the siloxane polyahl has a molecular weight of at least about 200, preferably about 500 to about 150,000, more preferably about 500 to about 50,000. When used as a curing agent, the molecular weight of the siloxane polyahl is preferably less than about 50,000. These molecular weight ranges are much broader than conventional polymeric polyahls (typically about 200 to about 5,000), enabling the siloxane polyahls to soften the resulting polyurethane or polyurea compositions and provide a relatively high level of light stability.

Any isocyanate available to one of ordinary skill in the art is suitable for use according to the present invention. The isocyanate may be organic, modified organic, saturated, aliphatic, alicyclic, unsaturated, araliphatic, aromatic, substituted, or unsubstituted diisocyanate or polyisocyanate monomers having two or more free reactive NCO groups;

isomers thereof; modified derivatives thereof; dimers thereof; trimers thereof; or isocyanurates thereof. The isocyanate may also include any isocyanate-terminated multimeric adducts, oligomers, polymers, prepolymers, low-free-monomer prepolymers, quasi-prepolymers, and modified polyisocyanates derived from the isocyanates and polyisocyanates above. Low-free-monomer prepolymers refer to prepolymers having free isocyanate monomer levels less than about 0.5 weight percent.

In addition to the free reactive isocyanate groups, the suitable isocyanate further comprises at least one cyclic, aromatic, aliphatic, linear, branched, or substituted hydrocarbon moiety R containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the isocyanates disclosed herein may be used alone or in combination of two or more thereof.

Preferred isocyanates include diisocyanates (having two NCO groups per molecule), biurets thereof, dimerized uretdiones thereof, trimerized isocyanurates thereof, and polyisocyanates such as monomeric triisocyanates. Diisocyanates typically have the generic structure of OCN—R—NCO. Exemplary diisocyanates include, but are not limited to, unsaturated isocyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4, 4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphththalene diisocyanate, anthracene diisocyanate, tetracene diisocyanate; and saturated isocyanates such as: 1,4-tetramethylene diisocyanate, 1,5-pentamethylene diisocyanate, 2-methyl-1,5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-novamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates ("HTDI"), isophorone diisocyanate ("IPDI"), isocyanatomethylcyclohexane isocyanate, isocyanatoethyl-cyclohexane isocyanate, bis(isocyanatomethyl)cyclohexane (i.e., 1,4-cyclohexane-bis(methylene isocyanate)), 4,4'-dicyclohexylmethane diisocyanate ("$H_{12}$MDI," i.e., bis(4-isocyanatocyclohexyl)-methane), 2,4'- and 4,4'-dicyclohexane diisocyanates, 2,4'- and 4,4'-bis (isocyanatomethyl) dicyclohexanes. Dimerized uretdiones of diisocyanates and polyisocyanates include, for example, unsaturated isocyanates such as uretdiones of toluene diisocyanates, uretdiones of diphenylmethane diisocyanates; and saturated isocyanates such as uretdiones of hexamethylene diisocyanates. Trimerized isocyanurates of diisocyanates and polyisocyanates include, for example, unsaturated isocyanates such as trimers of diphenylmethane diisocyanate, trimers of tetramethylxylene diisocyanate, isocyanurates of toluene diisocyanates; and saturated isocyanates such as isocyanurates of isophorone diisocyanate, isocyanurates of hexamethylene diisocyanate, isocyanurates of trimethyl-hexamethylene diisocyanates. Monomeric triisocyanates include, for example, unsaturated isocyanates such as 2,4,4'-diphenylene triisocyanate, 2,4,4'-diphenylmethane triisocyanate, 4,4',4"-triphenylmethane triisocyanate; and saturated isocyanates such as: 1,3,5-cyclohexane triisocyanate.

The saturated isocyanates display satisfactory light stability when used in golf balls cover layers, and are most preferred in golf ball outer cover layer or coating compositions. Other relatively light-stable isocyanates include some of the unsaturated isocyanates, particularly those that are araliphatic, including 1,2-, 1,3-, and 1,4-xylene diisocyanates, m-tetramethylxylene diisocyanate, p-tetramethylxylene diisocyanate, uretdiones of toluene diisocyanates, isocyanurates of toluene diisocyanates, and isocyanurates of diphenylmethane diisocyanates.

Isocyanate-terminated oligomers and polymers include any oligomers, polymers, prepolymers, or quasi-prepolymers having at least two free reactive isocyanate groups as terminal groups, and optionally more pendant isocyanate groups, on the oligomeric or polymeric backbones. Isocyanate-terminated prepolymers and quasi-prepolymers are well known to the skilled artisan, and include, but are not limited to, the reaction products of any one or combination of two or more of the isocyanates listed above and any one or combination of two or more of the polyahls disclosed herein below. It is well understood in the art that material hardness of polyureas, polyurethanes, and polyurethane/polyurea hybrids may be modified by adjusting the percent NCO content in the prepolymer, which may be up to about 30%. Conventionally, the prepolymer has less than about 15% NCO. A percent NCO of about 4% to about 9% may provide a relatively soft elastomer preferably suitable for covers or outer cover layers. A percent NCO of about 7% to about 15% may provide a relatively hard elastomer preferably suitable for intermediate layers, outer core layers, and/or inner cover layers.

Various reactive polyahls known to one of ordinary skill in the art may be used in the compositions of the present invention. Suitable reactive polyahls may be organic, modified organic, saturated, aliphatic, alicyclic, unsaturated, araliphatic, aromatic, substituted, unsubstituted, monomeric, oligomeric, or polymeric. The reactive polyahls preferably have two or more active hydrogen groups per molecule, such as primary or secondary hydroxy or amine groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing 1 to about 10 carbon atoms can be present as spacers between such groups. The cyclic or aromatic group(s) may be substituted at the 2-(ortho-), 3-(meta-), and/or 4-(para-) positions by, without limitation, halides, cyano groups, amine groups, silyl groups, hydroxy groups, acid groups, alkoxy groups, primary or secondary or tertiary hydrocarbons, or combinations of two or more thereof. The reactive polyahls disclosed herein may be used alone or in combination of two or more thereof.

Oligomeric and/or polymeric polyahls, optionally in a blend with the siloxane polyahl, may be reacted to the isocyanate, preferably forming a prepolymer, which is then cured with a curing agent. A weight ratio of the siloxane polyahl to any reactive polyahl or between any two reactive polyahls is about 1:20 to about 20:1. The reactive polyahls used in the prepolymer may have: 1) a relatively high molecular weight, at least about 200, preferably about 500 to about 20,000; 2) two or more active hydrogen groups as defined above, preferably at least one active hydrogen group at each terminal of the backbone. The reactive polyahls may also have active hydrogen groups pedant along the backbone, or embedded within the backbone (e.g. secondary amines). Suitable reactive polyahls include, but are not limited to, polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, or combinations of two or more thereof.

Preferred reactive polyahls are oligomers or polymers that are terminated with hydroxy groups, amine groups, or combinations thereof. Exemplary hydroxy-terminated oligomers or polymers include polyethers such as polytetramethylene ether glycol ("PTMEG"), modified PTMEG, poly(oxyethylene) glycol, poly(oxypropylene) glycol, poly(oxyethylene-oxypropylene) glycol, (ethylene oxide)-capped poly(oxypropylene) ether glycol; polyesters such as poly(ethylene adipate) glycol, poly(butylene adipate) glycol, poly(hexamethylene adipate) glycol, poly(ethylene propylene adipate) glycol, poly(ethylene butylene adipate) glycol, poly(hexamethylene butylene adipate) glycol, (o-phthalate-1,6-hexanediol)-based polyester polyol, poly(ethylene terephthalate)-based polyester polyol; polycaprolactones such as (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone; polycarbonates such as poly(phthalate carbonate) glycol, poly(hexamethylene carbonate) glycol (bisphenol A)-based polycarbonate glycols; polyhydrocarbons such as polyisoprene polyol, poly(hydrogenated isoprene) polyol, hydroxy-terminated liquid isoprene rubber, polybutadiene polyol, poly(hydrogenated butadiene) polyol, poly(ethylene-co-propylene) polyol, poly(ethylene-co-butylene) polyol, poly(alkylene-co-styrene) polyol, Kraton® polyols, glycerol-based polyols, (castor oil)-based polyols; acid functional oligomers or polymers (or ionomers thereof derived from partial or full neutralization with organic or inorganic cations), such as dimerate or trimerate polyols of fatty acids or isostearic acid, acid functional polyols as disclosed in U.S. Pat. No. 6,207,784; and hydroxy-terminated polyolefins or polyamides.

Saturated (aliphatic, alicyclic, or fully hydrogenated) members of the above-listed hydroxy-terminated oligomers or polymers are preferred for use in the present invention, because they afford superior light stability when incorporated into the golf ball cover composition. Exemplary saturated hydroxy-terminated polymers include PTMEG, modified PTMEG, poly(oxyethylene) glycol, poly(oxypropylene) glycol, poly(oxyethylene-oxypropylene) glycol, (ethylene oxide)-capped poly(oxypropylene) ether glycol, poly(ethylene adipate) glycol, poly(butylene adipate) glycol, poly(hexamethylene adipate) glycol, poly(ethylene propylene adipate) glycol, poly(ethylene butylene adipate) glycol, poly(hexamethylene butylene adipate) glycol, (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone, poly(hexamethylene carbonate) glycol, saturated poly(hydrogenated isoprene) polyol, saturated poly(hydrogenated butadiene) polyol, poly(ethylene-co-propylene) polyol, poly(ethylene-co-butylene) polyol, poly(alkylene-co-styrene) polyol, Kraton® polyols, saturated dimerate or trimerate polyols of fatty acids or isostearic acid, saturated hydroxy-terminated polyolefins, saturated hydroxy-terminated polyamides, and saturated glycerol or castor oil based polyols.

Suitable amine-terminated oligomers or polymers, preferably having a molecular weight of at least about 1,000, include, without limitation, polyethers such as polyoxyalkylene diamines, polyoxyethylene diamines, polyoxypropylene diamines, poly(oxyethylene-oxypropylene) diamines, polyoxypropylene triamines, poly(tetramethylene ether) diamines, (ethylene oxide)-capped polyoxypropylene ether diamines, poly(triethyleneglycol) diamines, poly(trimethylolpropane) triamines, polyethyleneglycol-di(p-aminobenzoate), polytetramethyleneoxide-di(p-aminobenzoate), glycerin-based triamines; and amine-terminated polyesters, polycaprolactones, polycarbonates, polyhydrocarbons, acid functional oligomers or polymers or ionomers thereof, polyolefins, or polyamides, preferably converted from the above-listed hydroxy-terminated oligomers or polymers through, for example, reductive amination with ammonia and hydrogen in the presence of a catalyst (Belgian Patent No. 634,741, U.S. Pat. Nos. 5,015,773, 5,003,107, and 3,654,370), hydrogenation (German Patent No. 1,193,671), amination of polyol/sulfonic acid esters (U.S. Pat. No. 3,236,895), reaction with epichlorohydrin and a primary amine (French Patent No. 1,466,708), or those listed in the publication "Jeffamine, Polyoxypropylene Amines" by Texaco Chemical Co., 1978.

Illustrative amine-terminated oligomers or polymers include polytetramethylene ether diamine, modified polytetramethylene ether diamine, poly(oxyethylene) diamine, poly(oxypropylene) ether diamine or triamine, poly(oxyethylene-oxypropylene) diamine, (ethylene oxide)-capped poly(oxypropylene) diamine, poly(ethylene adipate) diamine, poly(butylene adipate) diamine, poly(hexamethylene adipate) diamine, poly(ethylene propylene adipate) diamine, poly(ethylene butylene adipate) diamine, poly(hexamethylene butylene adipate) diamine, (o-phthalate-1,6-hexanediol)-based polyester polyamine, poly(ethylene terephthalate)-based polyester polyamine, (alkylene oxide)-initiated polycaprolactone polyamine, (ethylene glycol)-initiated polycaprolactone polyamine, (diethylene glycol)-initiated polycaprolactone polyamine, (propylene glycol)-initiated polycaprolactone polyamine, (dipropylene glycol)-initiated polycaprolactone polyamine, 1,4-butanediol-initiated polycaprolactone polyamine, trimethylolpropane-initiated polycaprolactone polyamine, (neopentyl glycol)-initiated polycaprolactone polyamine, 1,6-hexanediol-initiated polycaprolactone polyamine, (polytetramethylene ether glycol)-initiated polycaprolactone polyamine, poly(phthalate carbonate) diamine, poly(hexamethylene carbonate) diamine, (bisphenol A)-based polycarbonate diamines, polyisoprene polyamine, poly(hydrogenated isoprene) polyamine, amine-terminated liquid isoprene rubber, polybutadiene polyamine, poly(hydrogenated butadiene) polyamine, poly(ethylene-co-propylene) polyamine, poly(ethylene-co-butylene) polyamine, poly(alkylene-co-styrene) polyamine, glycerol-based polyamines, (castor oil)-based polyamines, dimerate or trimerate polyamines of fatty acids or isostearic acid, acid functional polyamines, and combinations of two or more thereof.

Saturated (aliphatic, alicyclic, or fully hydrogenated) amine-terminated oligomers or polymers are preferred for use in the present invention, because they afford superior light stability when incorporated into the golf ball cover compositions. Exemplary saturated amine-terminated oligomers or polymers include polyoxyalkylene diamines; polyoxyethylene diamines; polyoxypropylene diamines; poly(oxyethylene-oxypropylene) diamines; polyoxypropylene triamines; poly(tetramethylene ether) diamines; (ethylene oxide)-capped polyoxypropylene ether diamines; poly(triethyleneglycol) diamines; poly(trimethylolpropane) triamines; saturated glycerin-based triamines; and saturated amine-terminated polyesters, polycaprolactones, polycarbonates, polyhydrocarbons, acid functional polymers, polyolefins, or polyamides.

Low-molecular-weight versions, preferably less than about 10,000, of the oligomeric or polymeric polyahls as described above, may optionally be used as curing agents. The siloxane polyahls having a molecular weight of less than about 50,000 may also be used as a curing agent. Other curing agents having a molecular weight of at least about 50 include the monomeric reactive polyahls described below, and any other suitable compounds known to one of ordinary skill in the art, such as epoxy curatives. In a curing agent comprising two or more reactive polyahls, a weight ratio of the siloxane polyahl to any reactive polyahl or between any two reactive polyahls is about 1:20 to about 20:1. Most preferred curing agents are reactive polyahls having two or more active hydrogen groups and a molecular weight of about 50 to about 5,000.

Exemplar hydroxy-containing curing agents include, but are not limited to, unsaturated diols such as 1,3-bis(2-hydroxyethoxy) benzene, 1,3-bis[2-(2-hydroxyethoxy)ethoxy]benzene, N,N-bis(β-hydroxypropyl)aniline, 1,3-bis{2-[2-(2-hydroxyethoxy)ethoxy]ethoxy}benzene, hydroquinone-di(β-hydroxyethyl)ether, resorcinol-di(β-hydroxyethyl)ether; saturated diols such as ethylene glycol, diethylene glycol, polyethylene glycol, propylene glycol, dipropylene glycol, dimethylolcyclohexane, 2-methyl-1,3-propanediol, 2-methyl-1,4-butanediol, 1,2-, 1,3-, 1,4-, or 2,3-butanediols, 2,3-dimethyl-2,3-butanediol, 1,5-pentanediol, 1,6-hexanediol, polypropylene glycol, 1,3-bis(2-hydroxyethoxy)cyclohexane, 1,3-bis[2-(2-hydroxyethoxy)ethoxy]cyclohexane, 1,3-bis{2-[2-(2-hydroxyethoxy)ethoxy]ethoxy}cyclohexane; unsaturated triols such as castor oil (i.e., triricinoleoyl glycerol); saturated triols such as 1,2,4-butanetriol, 1,2,6-hexanetriol, trimethylolethane (i.e., 1,1,1-tri(hydroxymethyl)ethane), triethanolamine, triisopropanolamine, trimethylolpropane (i.e., 2,2-di(hydroxymethyl)-1-butanol); unsaturated tetraols such as 2,4,6-tris(N-methyl-N-hydroxymethyl-aminomethyl)phenol; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other polyols such as mannitol (i.e., 1,2,3,4,5,6-hexanehexol) and sorbitol (an enantiomer of mannitol) (both saturated).

Suitable amine-containing curing agents include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-)toluenediamine, 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl) ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5 '-tetraethyl-4,4'-diamino-dicyclohexylmethane (i.e., 4,4'-methylene-bis(2,6-diethylaminocyclohexane)), 3,3'-dichloro-4,4'-diamino-dicyclohexylnethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), trimethylolpropane-based triamines, glycerin-based triamines, (all saturated); tetramines such as N,N'-bis(3-aminopropyl)ethylene diamine (i.e., N₄-amine) (both saturated), triethylene tetramine; and other polyamines such as tetraethylene pentamine (also saturated).

Suitable amine/hydroxy-containing curing agents ("amino alcohols") may be monomeric, oligomeric, or polymeric, having at least one hydroxy group and at least one amine group. Non-limiting examples of amino alcohol curing agents include monoethanolamine (saturated), monoisopropanolamine (saturated), diethanolamine (saturated), diisopropanolamine (saturated), and 2-propanol-1,1'-phenylaminobis (unsaturated).

Saturated curing agents are preferably chosen to react with saturated prepolymers of saturated isocyanates and saturated reactive polyahls to form saturated reaction products or compositions for highly light-stable golf ball cover layers. In one embodiment, a hindered secondary diamine with high stearic hindrance, such as 4,4'-bis-(sec-butylamino)-dicyclohexylmethane (Clearlink® 1000 from UOP LLC of Des Plaines, Ill.) or N,N'-diisopropyl-isophorone diamine, may be used alone or in combination of other curing agent(s) to beneficially slow down the curing process. In another embodiment, a curing agent having a melting/freezing point of less than about 20° C., preferably less than about 15° C., may be used as a freezing point depressant. Such dual functional curing agents include, without limitation, 2-methyl-1,3-propanediol and 2-methyl-1,4-butanediol. Other useful freezing point depressants are disclosed in co-pending U.S. patent application Ser. No. 10/339,603, which is incorporated herein by reference in its entirety. Curatives most preferred for the present invention include 2,3-dimethyl-2,3-butanediol, 4,4'-bis-(sec-butylamino)-dicyclohexylmethane, 1,4-butanediol, 1,4-cyclohexyldimethylol, 2-methyl-1,3-propanediol, and 2-methyl-1,4-butanediol.

As described above, the siloxane polyahl of the present invention may be incorporated into a prepolymer or used as a curing agent. In particular, the siloxane polyahl is incorporated into one or more soft segments of the reaction product, and is absent in any hard segments of the reaction product. In forming the prepolymer, the siloxane polyahl, alone or in combination with other oligomeric or polymeric reactive polyahls, may react with the isocyanate at an equivalent ratio of about 0.01:1 to about 3:1. When the siloxane polyahl is used alone, the equivalent ratio is preferably about 1.5:1 to about 2.5:1, more preferably about 2:1. The siloxane polyahl suitable for prepolymers may have a relatively high molecular weight, preferably about 200 to about 150,000, more preferably about 500 to about 50,000, and most preferably from about 1,000 to about 30,000. The above-listed curing agents, alone or in combination of two or more thereof, may then be used to cure the prepolymer into a thermoplastic or thermoset material. An equivalent ratio of the prepolymer to the curing agent is preferably about 1:0.6 to about 1:1.5, more preferably about 1:0.8 to about 1:1.2, and most preferably about 1:0.95.

When used as a curing agent, the siloxane polyahl may have a low molecular weight relative to those suitable in the prepolymer, preferably less than about 50,000, more preferably about 200 to about 30,000, and most preferably about 500 to about 10,000. The siloxane polyahl curative may be used alone or in combination with other reactive polyahl curatives disclosed above, preferably present by at least about 0.01 equivalent per 1 equivalent of the total curative mixture, more preferably at least about 0.05 equivalent. The siloxane polyahl curative may be used with any of the prepolymers disclosed herein, any prepolymers formed from the reactive polyahls and the isocyanates listed above, and those prepolymers disclosed in U.S. Pat. Nos. 5,461,134 and 5,484,870 and U.S. patent application Ser. Nos. 10/072,395 and 10/228,311, which are incorporated herein by reference in their entirety. The equivalent ratio of the total prepolymer to the total curative is preferably about 1:0.6 to about 1:1.5. Other polyurethanes, polyureas, or polyurethane/polyurea hybrids comprising siloxane segments are encompassed by the scope of the present invention, and include the polydiorganosiloxane polyurea copolymers as described in U.S. Pat. Nos. 5,461,134, 5,512,650, 5,670,598, 6,007,914, 6,355,759, 6,407,195, and 6,441,118, the disclosures of which are incorporated herein by reference in their entirety.

A variety of additives can optionally be incorporated into the cover layer compositions of the present invention. For example, a catalyst may be employed to promote the reaction between the curing agent and the prepolymer. Suitable catalysts include, but are not limited to, zinc catalysts such as zinc octoate; cobalt (II) octoate, bismuth catalysts; tin catalysts, such as dibutyltin dilaurate (Dabco® T-12), dibutyltin diacetate (Dabco® T-1), tin (II or IV) chloride, dibutyltin dimethoxide (Fascat® 4211), dibutyltin dibutoxide (Fascat® 4214), tin (II) laurate, dimethyl-bis[(1-oxoneodecyl)oxy]stannane (Formez® UL-28), dibutyltin maleate, tin (II) ethylhexoate, tin (II) octoate, di(n-octyl)tin bis(isooctyl-mercaptoacetate) (Formez® UL-29), 1,3-diacetoxytetrabutyl-stannoxane, and 2-ethylhexyl-titanate; amine catalysts, such as triethylenediamine (Dabco® 33-LV), triethylamine, tributylamine, or N-methylmorpholine; organic acids, such as acetic acid, adipic acid, azelaic acid, octanoic acid, or oleic acid; delayed heated-activated catalysts, such as phenol-blocked 1,8-diaza-bicyclo(5,4,0)undecene-7 (Polycat™ SA-1/10), Polycat™ SA-102, or Polycat™ 8154. These catalysts may be used alone or in combination of two or more thereof, in an amount sufficient to catalyze the reaction, preferably about 0.001 percent to about 5 percent by weight of the total formulation, more preferably about 0.005 percent to about 3 percent. To lower processing temperature and mixing speed while retain comparable cure, the tin catalyst may be used at preferably about 0.05 weight percent to about 1 weight percent, more preferably about 0.25 weight percent to about 0.6 weight percent.

Any portion of the golf ball may further comprise at least one UV absorber and/or light stabilizer, preferably hindered amine light stabilizer, to deter yellowing and surface fracturing due to exposure to UV light and other weathering elements. These UV absorbers and light stabilizers are particularly useful in a visible golf ball portion, such as the coating layer, the outer cover layer, or any other internal layer when the layer(s) disposed about it are translucent or transparent. Suitable UV absorbers include: CGL 1545 (experimental triazine derivative) Tinuvin® 328 (2-(2'-hydroxy-3',5'-di(t-amylphenyl)benzotriazole), Tinuvin® 571 (2-(2H-benzotriazol-2-yl)-6-dodecyl-4-methylphenol), Tinuvin® P (2-(2-hydroxy-5-methylphenyl)benzotriazole), and by Ciba Specialty Chemicals; Uvinul® DS49 (disodium 2,2'-dihydroxy-4,4'-dimethyoxy-5,5'-disulfobenzophenone) and Uvinul® DS50 (2,2',4,4'-tetrahydroxy-benzophenone) by BASF Corporation; Sanduvor® PR-25 (dimethyl-4-methoxy-benzylidenemalonate) by Clariant Corporation; Cyasorb® UV-2337 (2-(2'-hydroxy-3',5'-di(t-amylphenyl)benzotriazole), Cyasorb® UV-1164 (2-(4,6-bis(2,4-dimethylphenyl)-1,3,5-triazin-2-yl)-5-octyloxyphenol), and Cyasorb® UV-3638 (2,2'-(1,4-phenylene)-bis(4-3,1-benzoxazin-4-one)) by Cytec Industries; Quercetin® (3,3', 4',5,7-pentahydroxy flavone) by EM Industries; UV-Chek® AM-300 (2-hydroxy-4-n-octyloxy-benzophenone) and UV-Chek® AM-340 (2,4-di(t-butylphenyl)-3,5-di(t-butyl)-4-hydroxybenzoate) by Ferro Corporation; Maxgard® DPA-8 (2-ethylhexyl-2-cyano-3,3-diphenylacrylate) by Garrison Industries; Givsorb® 2 (propanedione), Givsorb® 13, Givsorb® 14, and Givsorb® 15 by Givaudan-Roure Corporation; Norbloc® 6000 (2-(2'-hydroxy-5'-(2-hydroxyethyl)benzotriazole) and Norbloc® 7966 (2-(2'-hydroxy-5'-methacryloxyethylphenyl)-2H-benzotriazole) by Jessen Pharmaceuticals. Suitable light stabilizers include, but are not limited to, Tinuvin® 622LD (dimethyl succinate polymer with 4-hydroxy-2,2,6,6-tetramethyl-1-piperidine ethanol) and Tinuvin® 765 (bis(1,2,2,6,6-pentamethyl-4-piperidinyl)sebacate) by Ciba Specialty Chemicals Corporation; Sanduvor® 3070 (hindered amine) by Clariant Corporation; Cyasorb® UV-3581 (3-dodecyl-1-(2,2,6,6-tetramethyl-4-piperidylpyrrolidin-2,5-dione) by Cytec Industries. For aromatic and unsaturated formulations, the preferred UV absorber is Tinuvin® 328, and the preferred hindered amine light stabilizer is Tinuvin® 765. A preferred light stabilizer for saturated formulations is Tinuvin® 292. Other applicable compounds include Tinuvin® 213 and 770, and antioxidants to prevent degradation of the cover composition, such as Irganox® 1010 (tetrakis(3,5-di(t-butyl-hydroxyhydrocinnamate))methane) and Irganox® 1135 ($C_{7-9}$-branched alkyl ester of 3,5-di(t-butyl-4-hydroxyhydrocinnamic acid) by Ciba Specialty Chemicals Corporation and Sandostab® P-EPQ (aryl phosphonite) by Clariant Corporation.

Other additive for the cover layer compositions of the present invention include, but are not limited to, accelerators to speed up the polymerization reaction, fillers to adjust density and/or modulus of the layer, viscosity modifiers, release agents, plasticizers, compatibilizing agents, coupling agents, dispersing agents, colorants including pigments and dyes, optical brighteners, surfactants, stabilizers, metals, processing aids or oils to affect rheological and mixing properties, blowing agents, and any other modifying agents known to one of ordinary skill in the art. Pigments may be fluorescent, autofluorescent, luminescent, or chemoluminescent, and include white pigments such as titanium oxide and zinc oxide. These additives may be used in amounts sufficient to achieve their specific purposes and desired effects.

As used herein, the term "filler" refers to any compound or composition that can be used to vary certain properties of selected portions of the golf ball, including density or specific gravity, flexural modulus, tensile modulus, strength, moment of inertia, hardness, abrasion resistance, weatherability, volume, weight, etc. The fillers are preferably in the forms of nano-scale or micro-scale powders, fibers, filaments, flakes, whiskers, wires, tubes, or particulates for homogenous dispersion. Suitable fillers for golf balls may be solid or hollow, and include, for example, metal (or metal alloy) powder, metal oxide and salts, ceramics, particulates, carbonaceous materials, polymeric materials, glass microspheres, and the like or blends thereof. Non-limiting examples of metal (or metal alloy) powders include, but are not limited to, bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include, but are not limited to, zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, colloidal silica, boron, clay, talc, glass fibers, aramid fibers, mica, diatomaceous earth, regrind (typically recycled core material mixed and ground to 30 mesh particle size). Examples of polymeric materials include, but are not limited to, hollow spheres or microspheres of chemically or physically foamed thermoplastic or thermosetting polymers, such as epoxies, urethanes, polyesters, nucleated reaction injection molded polyurethanes or polyureas.

Conventional materials for golf ball cover, intermediate layer, or core that may be blended with the polyurethane, polyurea, or hybrid compositions of the present invention, by about 1 weight percent to about 95 weight percent of the composition, include:

1) Non-ionomeric acid polymers such as copolymers of an olefin and a carboxylic acid or terpolymers of an olefin and a softening comonomer and a carboxylic acid, in which the olefin has from 2 to 8 carbon atoms and the carboxylic acid has 3 to 8 carbon atoms. The carboxylic acid groups may include acrylic, methacrylic, crotonic, maleic, fumaric or itaconic acid. The softening comonomer includes vinyl esters of aliphatic carboxylic acids wherein the acid has 2 to 10 carbon atoms, alkyl ethers wherein the alkyl group has 1 to 10 carbon atoms, alkyl acrylates wherein the alkyl group has 1 to 10 carbon atoms, or alkyl alkylacrylates wherein the alkyl group has 1 to 10 carbon atoms. Preferred non-ionomeric acid polymers include Nucrel® from E.I. DuPont de Nemours & Company and Escor® from ExxonMobil. These are copolymers or terpolymers of ethylene and methacrylic acid or acrylic acid partially neutralized. Preferably these ionomers comprises at least about 10% by weight of the carboxylic acid, more preferably at least about 16% by weight.

2) Ionomers such as highly neutralized versions of the acid copolymers or terpolymers described in 1) above. Specifically, the carboxylic acid groups are totally or partially neutralized with cations. Preferred ionomers include Surlyn® from E.I. DuPont de Nemours & Company and Iotek® from ExxonMobil. These are copolymers or terpolymers of ethylene and methacrylic acid or acrylic acid partially neutralized with zinc, sodium, lithium, magnesium, potassium, calcium, manganese, nickel or the like.

3) Polyolefins such as polyethylene, polypropylene, polybutylene and copolymers such as ethylene methylacrylate, ethylene ethylacrylate, ethylene vinyl acetate, copolymers and homopolymers produced using single-site catalyst such as metallocene.

4) Polyurethanes prepared from polyols and diisocyanates or polyisocyanates, including thermoplastic polyurethanes, thermoset polyurethanes, polyurethane ionomers, and those disclosed in U.S. Pat. No. 6,235,830, which patent is incorporated herein by reference.

5) Polyurea such as thermoplastic polyurea, thermoset polyurea, polyurea ionomers, and include those disclosed in U.S. Pat. No. 5,484,870 and U.S. patent application Ser. Nos. 10/072,395 and 10/228,311, all of which are incorporated herein by reference in their entirety.

6) Vinyl resins such as polyvinyl alcohols, polyvinyl alcohol copolymers, polyvinyl chloride, block copolymers of alkenyl aromatics with vinyl aromatics and polyesteramides, copolymers of vinyl chloride with vinyl acetate, acrylic esters or vinylidene chloride.

7) Polyamides such as poly(hexamethylene adipamide) and others prepared from diamines, fatty acids, dibasic acids, and amino acids (poly(caprolactam)), and blends of polyamides with Surlyn®, ethylene homopolymers or copolymers or terpolymers, etc.

8) Acrylic resins and blends of these resins with poly vinyl chloride, elastomers, etc.

9) Thermoplastic or thermoset (vulcanized) synthetic or natural rubbers, such as balata, isoprene rubber, ethylene-propylene rubber, ethylene-butylene rubber, polyolefins, blends of polyolefins with ethylene-propylene-(non-conjugated diene) terpolymer, styrene-butadiene copolymers, polystyrene polymers, poly(styrene-co-maleic anhydride), acrylonitrile-butylene-styrene copolymers, poly(styrene sulfonate), thermoplastic block copolymers (Kraton® rubbers from Shell Chemical), or co-polyetheramides (Pebax® from AtoFina).

10) Polyphenylene oxide resins, polyarylene ethers, or blends of polyphenylene oxide with high impact polystyrene such as Noryl® from General Electric Company.

11) Thermoplastic polyesters, such as poly(ethylene terephthalate), poly(butylene terephthalate), poly(propylene terephthalate), poly(trimethylene terephthalate), modified poly(ethylene terephthalate)/glycol, poly(ethylene naphthalate), cellulose esters, Hytrel® from E.I. DuPont de Nemours & Company, and Lomod® from General Electric Company.

12) Other thermoplastics, such as polyacetals, polyimides, polyetherketones, polyamideimides.

13) Blends and alloys, including blends of polycarbonate and acrylonitrile-butylene-styrene, blends of polycarbonate and polyurethane, blends of polyvinyl chloride with acrylonitrile-butadiene-styrene or ethylene vinyl acetate or other elastomers, blends of thermoplastic rubbers with polyethylene or polypropylene.

Preferably, a thermoplastic polyurethane, polyurea, or polyurethane/polyurea hybrid of the present invention is blended with one or more thermoplastic materials listed above to form a thermoplastic composition for a golf ball portion.

The cover layer formed from the compositions of siloxane polyahl as disclosed herein preferably has a WVTR of less than about 2 g/(m²×day), a modulus of about 1,000 to about 100,000 psi, a material hardness of less than about 90 Shore D, more preferably less than about 70 Shore D, and a hardness as measured on the ball of less than about 80 Shore D. In one embodiment, the cover layer has a Shore D hardness of about 30 to about 70 and a modulus of about 10,000 psi to about 80,000 psi. The cover layer may have any thickness of less than about 0.5 inch, preferably thin with a thickness of less than about 0.05 inch, more preferably about 0.005 inch to about 0.03 inch. Alternatively, the cover layer is relatively thick, about 0.05 inch to about 0.2 inch, preferably about 0.05 inch to about 0.1 inch. The cover layer preferably has an inner diameter of about 0.5 inch to about 1.7 inches, and an outer diameter of about 0.7 inch to about 1.8 inches. The golf ball compression is preferably less than about 100.

Any method known to one of ordinary skill in the art may be used to produce the cover layer of the present invention. One-shot method involving concurrent mixing of the isocyanate, the siloxane polyahl, and the curing agent is feasible, but the resulting mixture is non-homogenous and difficult to control. The prepolymer method described above is most preferred, because it affords a more homogeneous mixture resulting in a more consistent polymer composition. The prepolymer may be reacted with a diol or a secondary diamine to form a thermoplastic material, or reacted with a triol, tetraol, primary diamine, triamine, or tetramine to form a thermoset material. Other methods suitable for forming the layers of the present invention include casting, compression molding, reaction injection molding ("RIM"), liquid injection molding ("LIM"), injection-compression molding, pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials such as polyurea, polyurethane, and polyurethane/polyurea hybrid can provide very thin layers such as outer cover layers that are desirable on golf balls. Other techniques include spraying, dipping, spin coating, or flow coating methods.

In a preferred embodiment, an outer core layer, intermediate layer, or inner cover layer may be formed from thermoplastics, thermoplastic elastomers, ionomers, acid copolymers, or highly neutralized acid copolymers as described herein. A second polymer component may be blended in, such as ionomeric copolymers or terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like or combinations thereof. The outer cover layer may be formed from a thermoplastic or thermoset polyurethane or polyurea, such as the ones disclosed herein. Preferably the polyurethane or polyurea is saturated.

The core of the golf balls in the present invention may be solid, fluid-filled, gel-filled, or gas-filled. The solid core can be made from any suitable core materials including thermoset plastics, such as natural rubber, polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax® from AtoFina Chemicals Inc., Hytrel® from E.I. Du Pont de Nemours and Company, thermoplastic urethane from various manufacturers, and Kraton® from Shell Chemical Company. The core materials can also be formed from a castable material. Suitable castable materials include polyurethanes, polyureas, epoxies, silicones, etc. Additionally, suitable core materials may also include a RIM polyurethane or polyurea, preferably the nucleated versions, where a nitrogen gas is whipped into the reaction mixture prior to injection into a closed mold to form the layer.

Preferred compositions for solid cores include a base rubber, a crosslinking agent, and an initiator. The base rubber typically includes natural or synthetic rubbers. A preferred base rubber is 1,4-polybutadiene ("PBD") having a cis-bond of at least about 40%, a Mooney viscosity of at least about 30, a molecular weight of at least about 150,000, and a polydispersity of less than about 4. Examples of desirable PBD rubbers include Buna® CB22 and CB23 from Bayer, Ubepol® 360L and 150L from Ube Industries, and Cariflex® BCP820 and BCP824 from Shell Chemical. Blends of two or more such PBD's are desirable for the solid cores, such as a Co-PBD or Ni-PBD having a Mooney viscosity of from about 50 to about 150 mixed with a Nd-PBD having a Mooney viscosity of from about 30 to about 100. The weight ratio of Co(Ni)-PBD to Nd-PBD is about 5:95 and 95:5. PBD can be mixed with other elastomers known in the art, such as natural rubber, polyisoprene rubber, or styrene-butadiene rubber to further modify the core.

Suitable cross-linking agents for the polybutadiene-based solid cores include metal salts of unsaturated fatty acid having 3 to 8 carbon atoms, such as diacrylate, dimethacrylate, and monomethacrylate, wherein the metal can be Mg, Ca, Zn, Al, Na, Li or Ni. Preferred acrylates include zinc diacrylate, zinc dimethacrylate, and blends thereof. Zinc diacrylate is preferred because it provides golf balls with a high initial velocity, but the present invention is not limited thereto. The crosslinking agent is typically present in an amount of at least about 10 parts per hundred ("pph") parts of the base polymer, preferably about 20 pph to about 40 pph.

The peroxide initiators used to promote the cross-linking reaction in the core are well known in the art, and can be any known peroxides or blends thereof that decompose during the cure cycle. Suitable peroxide initiators include organic peroxide compounds, such as dicumyl peroxide, 1,1-di(t-butylperoxy) 3,3,5-trimethyl cyclohexane, α,α-bis (t-butylperoxy) diisopropylbenzene, 2,5-dimethyl-2,5 di(t-butylperoxy) hexane, di-t-butyl peroxide, and blends thereof. Commercially available examples include, but are not limited to, Varox® 231XL and DCP-R from AtoFina, Perkadox® BC and 14 from Akzo Nobel, and Elastochem® DCP-70 from Rhein Chemie. In their pure forms, the initiators are present in an amount by weight of at least about 0.25 pph of the base polymer, preferably between about 0.5 pph and about 2.5 pph. One skilled in the art may adjust the initiator amount according to activity and concentration.

In polybutadiene-based solid cores of the present invention, it is preferred to blend in a halogenated organosulfur compound such as a halogenated thiophenol or a metal salt thereof to further enhance the softness and resiliency of the core. The halogenated thiophenol, preferably pentachlorothiophenol ("PCTP") or ZnPCTP, function in part as a cis-to-trans catalyst that convert some cis-1,4 bonds in the polybutadiene into trans-1,4 bonds. The utilization of halogenated organosulfur compounds like PCTP and ZnPCTP in golf balls to produce soft and fast cores is disclosed in co-pending U.S. patent application Ser. No. 09/951,963, which is incorporated by reference herein in its entirety. PCTP is available under the tradename of Struktol® from Struktol Company of America, and ZnPCTP is available from eChinaChem. The halogenated organosulfur compounds are present in an amount of at least about 0.1 pph of the base rubber, preferably about 0.1 pph to about 2 pph; alternatively the amount of halogenated organosulfur compound used is at least about 2 pph, preferably about 2.3 pph to about 5 pph.

The solid core may also include fillers to adjust hardness, strength, modulus, weight, density and/or specific gravity of the core. Suitable fillers include metal or alloy powders, metal oxides and salts, ceramics, particulate, carbonaceous materials, polymeric materials, glass microspheres, and the like or blends thereof. These fillers may be hollow, solid, filled, unfilled, surface treated, or non-surface treated. Specific fillers for the core include tungsten powder, tungsten carbide, zinc oxide, tin oxide, tungsten oxide, barium sulfate, zinc sulfate, barium carbonate, calcium carbonate, zinc carbonate, an array of silica and clay, regrind (recycled core material typically ground to about 30 mesh particle), and high-Mooney-viscosity rubber regrind.

Other optional additives for golf ball core are well known in the art, and may be blended into the core in amounts sufficient to achieve their specific purposes and desired effects. Such additives include accelerators to speed up the polymerization reaction, processing aids or oils to affect rheological and mixing properties, foaming agents, cis-to-trans catalysts, adhesives, coupling agents, stable free radicals, radical scavengers, scorch retarders, and blends thereof.

The core of the golf ball of the present invention has a diameter of at least about 0.5 inch, preferably at least about 1 inch, more preferably from about 1.5 inches to about 1.65 inches, and most preferably from about 1.55 inches to about 1.6 inches. The core may have a compression of about 20 to about 120, preferably about 30 to about 100, and more preferably about 40 to about 80. Alternatively, the core may be very soft, with a compression of less than about 20. The core should also be highly resilient, having a COR of preferably at least about 0.7, more preferably at least about 0.75, and most preferably at least about 0.8. Conventional methods and techniques may be used to form the solid cores from the base compositions disclosed herein.

As mentioned before, an optional intermediate layer may be disposed between the core and the cover. The intermediate layer may be part of the core as an outer core layer, or part of the cover as an inner cover layer. The intermediate layer may also be referred to as an outer core layer or an inner cover layer. The intermediate layer of the golf ball may be made of a thermoset rubber based material, including those core compositions mentioned above. Alternatively, the intermediate layer may comprise non-ionomeric acid polymers or ionomeric derivatives thereof, polyamides, polyolefins, polyurethanes, polyurea, cast or RIM polyurethanes or polyurea, epoxies, polyesters, polyetheresters such as Hytrel® from DuPont, polyetheramides such as Pebax® from AtoFina, nylons, single-site catalyzed polymers, metallocene-catalyzed polymers, poly(ethylene terephthalate), poly(butylene terephthalate), poly(propylene terephthalate), poly(trimethylene terephthalate), poly (ethylene naphthalate), polystyrene polymers, poly(styrene-co-maleic anhydride), functionalized styrene-butadiene elastomers, styrenic block copolymers such as Kraton® from Shell Chemicals, acrylonitrile-butadiene-styrene copolymers ("ABS"), poly(styrene sulfonate), polyethylene styrene, grafted polypropylenes, grafted polyethylenes, polyvinyl chlorides, grafted polyvinyl chlorides, polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides, block copolymers of alkenyl aromatics with vinyl aromatics, polyesteramides, polyamides, polyimides, polyetherketones, polyamideimides, silicone, metal salts of fatty acids, and any of the core or cover layer compositions disclosed herein, including the formulations comprising the siloxane polyahl. Two or more of these materials may be blended together to form the intermediate layer.

In one embodiment, the intermediate layer is a continuous layer formed from one or more non-ionomeric acid polymers and/or ionomers derived therefrom. The non-ionomeric acid polymer may be an E/Y copolymer or E/X/Y terpolymer, where E is an olefin, Y is a carboxylic acid, and X is a softening comonomer. Preferably, the olefin is ethylene, the carboxylic acid is acrylic acid, methacrylic acid, crotonic acid, maleic acid, fumaric acid, itaconic acid, or a combination thereof, and the softening comonomer is vinyl esters of aliphatic carboxylic acids of 2 to about 10 carbon atoms, alkyl ethers of 1 to about 10 carbon atoms, alkyl acrylates or alkyl alkylacrylates of 1 to about 10 carbon atoms, or blends thereof. The copolymer or terpolymer preferably has an acid content of from about 1% to about 30% by weight, a melt flow rate of about 1 g/10-min to about 500 g/10-min, a WVTR of from about 0.01 to about 0.9 g·mm/m$^2$/day at 38° C. and 90% relative humidity, a flexural modulus of about 5,000 psi to about 55,000 psi, and a material hardness of about 20 Shore D to about 65 Shore D. Specific examples of the non-ionomeric acid copolymer include ethylene/acrylic acid copolymers ("EAA") and ethylene/methacrylic acid copolymers ("EMAA"). Examples of the non-ionomeric acid terpolymer are ethylene/methyl acrylate/acrylic acid terpolymers ("EMAAA"), ethylene/n-butyl acrylate/methacrylic acid terpolymers, and ethylene/isobutyl acrylate/methacrylic acid terpolymers. Commercially, EAA resins are available from Dow Chemical under the trade name of Primacor® and from ExxonMobil Chemical under the trade name of Escor®, EMAA resins are available from E.I. du Pont de Nemours and Company under the trade name of Nucrel®, and EMAAA resins are available from ExxonMobil Chemical under the trade name of Escor® AT.

The non-ionomeric acid polymers disclosed herein may be converted to acid ionomers through partial or full neutralization with a metal cation such as sodium, lithium, potassium, zinc, magnesium, or calcium. Suitable ionomers include high-acid ionomers, high-flow ionomers, and blends thereof. High-acid ionomers are ionic copolymers or terpolymers having an acid content of at least about 16% by weight. At least about 10% by weight of the carboxylic acid groups are neutralized with a metal cation. Preferably, between about 30% and about 100% of the carboxylic acid groups are neutralized. High-acid ionomers are commercially available from several different manufacturers. For example, ionic copolymers of ethylene and methacrylic acid are produced by E.I. DuPont de Nemours & Company under the trademark of Surlyn®, ionic copolymers and terpolymers of ethylene and acrylic acid are produced by ExxonMobil Chemical under the trademarks of Escor® and Iotek®, filler-modified poly(ethylene-methacrylic acid) ionomers are produced by DuPont under the trademark of Bexloy®, ionomeric polyethylene copolymers are produced by A. Schulman Inc. under the trademark of Formion®, and polyolefin ionomers are produced by Diamond & Network Polymers, Inc.

The intermediate layer may incorporate a filler to attain preferred physical and mechanical properties. Preferably, the filler is a modulus-enhancing filler, including tungsten, tungsten oxide, barium sulfate, carbon black, silica, titanium oxide, or a blend thereof. Preferably, the amount of the fillers in the composition ranges from about 5% to about 70% by weight, more preferably from about 10% to about 50% by weight.

The composition of the intermediate layer may have a modulus of about 1,000 psi to about 150,000 psi, a material hardness of about 20 Shore C to about 80 Shore D, a thickness of about 0.005 inch to about 0.6 inch, and a hardness as measured on the golf ball of less than about 80 Shore D. The intermediate layer preferably has an outside diameter in the range of 70% to 98% of the finished ball diameter and an inner diameter in the range of 30% to 90% of the finished ball diameter. Alternatively, the intermediate layer may have an inner diameter of about 0.5 inch to about 1.6 inches, and an outside diameter of about 1 inch to about 1.65 inches. To prevent or minimize the penetration of moisture, typically water vapor, into the core, the intermediate layer preferably has a WVTR lower than that of the cover. More preferably, the WVTR of the intermediate layer is no greater than that of an ionomer resin such as Surlyn®, which is in the range of about 0.45 g/(m$^2$×day) to about 0.95 g/(m$^2$×day).

The composition of the intermediate layer may be applied as a liquid, powder, dispersion, lacquer, paste, gel, melt, or solid half shells. The intermediate layer may be formed around the core or onto the inside of the cover by sheet stock or vacuum shrink-wrapping, compression molding, injection molding, vacuum deposition, RIM, lamination, casting, spraying, dipping, powder coating, or any other deposition means. Preferably, a combination of these methods is used, such as injection/compression molding, RIM/compression molding, pre-form/compression molding, injection molding/ grinding, injection/progressive compression molding, or co-injection molding. A simplified casting method using a single block material to produce the intermediate layer can be utilized to make any castable components of the golf ball, including any intermediate layer, the innermost core or any portion of the cover. The suitable manufacturing methods discussed herein are discussed in more details in co-pending U.S. patent application Ser. No. 09/973,342, which is incorporated by reference in its entirety.

The resulting golf ball, including the core, the intermediate layer and the cover as described above, preferably has a COR of greater than about 0.7, and more preferably greater than about 0.8. The golf ball preferably has an Atti compression of at least about 30, more preferably from about 50 to about 120, and most preferably from about 50 to about 90. The golf ball preferably has an overall diameter of at least about 1.68 inches, more preferably from about 1.68 inches to about 1.76 inches. The golf ball further has a dimple coverage on its outermost surface of greater than about 60%, preferably greater than about 70%. Preferred dimple patterns involving catenary curves, and preferred lift and drag characteristics of the golf ball of the present invention are disclosed in co-pending U.S. application Ser. Nos. 09/989, 191 and 10/096,852, respectively, both incorporated herein by reference in their entirety.

The material compositions of the present invention and their application in golf balls are further illustrated in the following non-limiting example. Table I tabulates the formulation of the respective polyurethane covers, their physical properties, and performance characteristics of the golf balls employing the two different polyurethanes in their covers.

TABLE I

|  | Controls | Samples |
|---|---|---|
| Cover Formulation Prepolymer | Polyurethane 1 equivalent of H$_{12}$MDI/caprolactone prepolymer (6% NCO) | Polyurethane 1 equivalent of H$_{12}$MDI/caprolactone prepolymer (6% NCO) |
| Curing Agent(s) | 0.95 equivalent of 1,4-butanediol | 0.85 equivalent of 1,4-butanediol and 0.1 equivalent of PDMS diamine |
| Physical Properties |  |  |
| Cover Hardness on the ball | 82 Shore C (60 Shore D) | 78 Shore C (56 Shore D) |
| Ball Compression | 88 | 86 |
| Performance Data |  |  |
| COR at 125 ft/s | 0.809 | 0.812 |

The prepolymer used in both controls and samples is a reaction product of H$_{12}$MDI and a PTMEG-initiated polycaprolactone polyol supplied by Sovereign Specialty Chemicals. PDMS diamine used in the samples is supplied by 3M Company, with a molecular weight of about 5,000. Both the controls and samples comprise a solid polybutadiene core of about 1.55 inches in diameter, a Surlyn® ionomer-based intermediate layer of about 0.035 inch thick, and a cover of about 0.03 inch thick. The final golf balls have a diameter of about 1.68 inches. The data of table I show that the PDMS diamine improves the cover softness and the ball COR.

The compositions for golf ball portions as disclosed herein may be used in sporting equipment in general. Specifically, the compositions may be applied in various game balls, golf club shafts, golf club head inserts, golf shoe components, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising a core and a cover, wherein the core or the cover comprises a thermoplastic or thermoset composition comprising a reaction product of an isocyanate and a siloxane polyahl having a formula of:

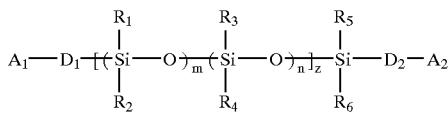

where $R_1$ is a hydrocarbon moiety;
$R_2$ is a hydrogen atom;
$R_3$ to $R_6$ are independently selected from hydrogen or hydrocarbon moieties;
$D_1$ and $D_2$ are optional and independent hydrocarbon moieties;
$A_1$ and $A_2$ are independent active hydrogen moieties;
m is an integer from 1 to about 1,000;
n is zero or an integer from 1 to about 1,000; and
z is an integer from 1 to about 100.

2. The golf ball of claim 1, wherein the hydrocarbon moieties are linear, branched, aromatic, aliphatic, or alicyclic, comprising about 1 to about 12 carbon atoms.

3. The golf ball of claim 1, wherein the active hydrogen moieties comprise primary hydroxy groups, secondary hydroxy groups, primary amine groups, or secondary amine groups.

4. The golf ball of claim 1, wherein the reaction product is a thermoplastic or thermoset polyurethane, polyurea, or polyurethane/polyurea hybrid; a castable reactive liquid material; or a prepolymer thereof.

5. The golf ball of claim 1, wherein the siloxane polyahl has a molecular weight of about 500 to about 150,000.

6. The golf ball of claim 1, wherein the reaction product further comprises an oligomeric or polymeric reactive polyahl being aliphatic, alicyclic, araliphatic, or aromatic, and comprising polyether polyahls, polyester polyahls, polycaprolactone polyahls, polycarbonate polyahls, polyhydrocarbon polyahls, polyamide polyahls, polyolefin polyahls, polysiloxane polyahls, or polyahls converted from acid functional oligomers or polymers or ionomers thereof.

7. The golf ball of claim 1, wherein an equivalent ratio of the siloxane polyahl to the isocyanate is about 0.01:1 to about 3:1; and wherein the isocyanate is organic, modified organic, aliphatic, alicyclic, unsaturated, araliphatic, aromatic, substituted, or unsubstituted, comprising isocyanate-containing monomers, dimers, trimers, multimeric adducts, oligomers, polymers, prepolymers, low-free-monomer prepolymers, quasi-prepolymers, diisocyanates, polyisocyanates, biurets, uretdiones, isocyanurates, or blends thereof.

8. The golf ball of claim 1, wherein the composition further comprises a curing agent comprising saturated or unsaturated monomeric polyahls, oligomeric polyahls, polymeric polyahls, polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, diols, triols, tetraols, polyols, diamines, triamines, tetramines, polyamines, or amino alcohols.

9. The golf ball of claim 8, wherein the reaction product is a prepolymer having a NCO content of less than about 15 percent; and wherein an equivalent ratio of the prepolymer to the curing agent is about 1:0.6 to about 1:1.5.

10. The golf ball of claim 1, wherein the isocyanate, the siloxane polyahl, the reaction product, and the composition are all substantially saturated.

11. The golf ball of claim 1, wherein the reaction product has a material hardness of less than about 70 Shore D.

12. The golf ball of claim 1, wherein the golf ball has a compression of less than about 100.

13. The golf ball of claim 1, wherein the core comprises a solid, liquid-filled, or gas-filled center and an outer core layer.

14. The golf ball of claim 1, wherein the cover comprises an outer cover layer and an inner cover layer; and wherein at least one of the outer cover layer or the inner cover layer comprises a thermoplastic polyurethane, thermoset polyurethane, thermoplastic polyurea, or thermoset polyurea composition.

15. The golf ball of claim 1, further comprising an intermediate layer disposed between the core and the cover, wherein the intermediate layer comprises thermoplastics, ionomers, highly neutralized acid polymers, or thermoplastic elastomers.

16. A golf ball comprising a core and a cover, wherein the core or the cover comprises a thermoplastic or thermoset reaction product of a first reactive polyahl, an isocyanate, and a substantially saturated siloxane polyahl having a formula of:

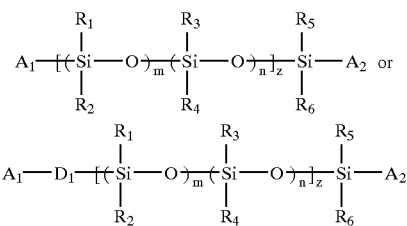

where $R_1$ is a hydrocarbon moiety;

$R_2$ to $R_6$ are independently selected from hydrogen or hydrocarbon moieties;

$D_1$ and $D_2$ are hydrocarbon moieties;

$A_1$ and $A_2$ are independent active hydrogen moieties, at least one of which comprises secondary hydroxy group, primary amine group, or secondary amine group;

m is an integer from 1 to about 1,000;

n is zero or an integer from 1 to about 1,000; and z is an integer from 1 to about 100.

17. A golf ball comprising a core and a cover, wherein the core or the cover comprises a thermoplastic or thermoset reaction product of an isocyanate and a siloxane polyahl, and wherein the siloxane polyahl is a homo-oligomer, co-oligomer, homopolymer, or copolymer consisting 5–10 repeating organosiloxane monomer units of the following structure:

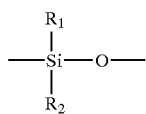

where $R_1$ is a linear, branched, aromatic, aliphatic, or alicyclic hydrocarbon moiety having 1 to about 12 carbon atoms; and $R_2$ is hydrogen or a hydrocarbon moiety.

18. The golf ball of claim 16, wherein the first reactive polyahl comprises monomeric polyahls, oligomeric polyahls, polymeric polyahls, polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, diols, triols, tetraols, polyols, diamines, triamines, tetramines, polyamines, or amino alcohols.

19. The golf ball of claim 16, wherein an equivalent ratio of the siloxane polyahl to the isocyanate is about 0.01:1 to about 3:1; and wherein the isocyanate is organic, modified organic, aliphatic, alicyclic, unsaturated, araliphatic, aromatic, substituted, or unsubstituted, comprising isocyanate-containing monomers, dimers, trimers, multimeric adducts, oligomers, polymers, prepolymers, low-free-monomer prepolymers, quasi-prepolymers, diisocyanates, polyisocyanates, biurets, uretdiones, isocyanurates, or blends thereof.

20. The golf ball of claim 16, wherein the reaction product comprises a curing agent comprising the siloxane polyahl having a molecular weight of less than about 50,000, and the siloxane polyahl is present in an amount of at least about 0.05 equivalent per 1 equivalent of the curing agent.

21. The golf ball of claim 20, wherein the first reactive polyahl reacts with the isocyanate to form a prepolymer having a NCO content of less than about 15 percent; and wherein an equivalent ratio of the prepolymer to the curing agent is about 1:0.6 to about 1:1.5.

22. The golf ball of claim 20, wherein the curing agent further comprises a second saturated or unsaturated reactive polyahl comprising monomeric polyahls, oligomeric polyahls, polymeric polyahls, polyether polyahls, polyester polyahls, polycaprolactone polyahls, polycarbonate polyahls, polyhydrocarbon polyahls, polyamide polyahls, polyolefin polyahls, polysiloxane polyahls, polyahls converted from acid functional oligomers or polymers or ionomers thereof, diols, triols, tetraols, polyols, diamines, triamines, tetramines, polyamines, or amino alcohols.

23. The golf ball of claim 16, wherein the first reactive polyahl, the isocyanate, and the reaction product are all substantially saturated.

24. The golf ball of claim 16, wherein the cover comprises an outer cover layer and an inner cover layers, and wherein at least one of the inner cover layer or the outer cover layer comprises a thermoplastic polyurethane, thermoset polyurethane, thermoplastic polyurea, or thermoset polyurea composition having a Shore D hardness of about 30 to about 70 and a flexural modulus of about 10,000 psi to about 80,000 psi.

* * * * *